United States Patent [19]
Cecil

[11] 3,945,069
[45] Mar. 23, 1976

[54] THREADING TAPS
[76] Inventor: Robert J. Cecil, 1505 Ogden NW., Warren, Ohio 44483
[22] Filed: June 21, 1974
[21] Appl. No.: 481,894

[52] U.S. Cl.............. 10/141 R; 408/219; 408/222
[51] Int. Cl.².......................................... B23G 5/06
[58] Field of Search ............ 10/140, 141 R, 141 F; 85/47; 408/215–222, 224

[56] References Cited
UNITED STATES PATENTS

| 224,921 | 2/1880 | Kenworthy ........................ 10/141 R |
| 425,372 | 4/1890 | Dillon ................................. 408/222 |
| 832,076 | 10/1906 | Oster ................................. 408/224 |
| 1,111,413 | 9/1914 | Smith ................................. 408/219 |
| 1,293,432 | 2/1919 | Higgins .............................. 408/219 |
| 1,345,425 | 7/1920 | Wells ................................. 408/219 |
| 1,365,338 | 1/1921 | Muth ................................. 408/222 |
| 2,029,514 | 2/1936 | Thomson ........................... 408/217 |
| 2,330,099 | 9/1943 | Whyland ............................ 408/217 |
| 2,787,010 | 4/1957 | Uphoff ............................... 408/215 |
| 3,661,471 | 5/1972 | Simonffy ........................... 10/141 R |

FOREIGN PATENTS OR APPLICATIONS

| 435,028 | 0000 | Italy ................................... 10/141 R |

Primary Examiner—C. W. Lanham
Assistant Examiner—E. M. Combs
Attorney, Agent, or Firm—Michael Williams

[57] ABSTRACT

A threading tap, having the usual longitudinally extending flutes to provide lands therebetween. Each land is provided with screw-cutting teeth, and each land has at least one cross-groove formed therein of a length equal to at least two teeth and of a depth greater than the root depth of adjoining teeth. A cross-groove in one land is longitudinally off-set from a cross-groove in an adjoining land to provide for chip clearance and yet not materially weaken the structure of the tap.

5 Claims, 6 Drawing Figures

U.S. Patent  March 23, 1976  3,945,069
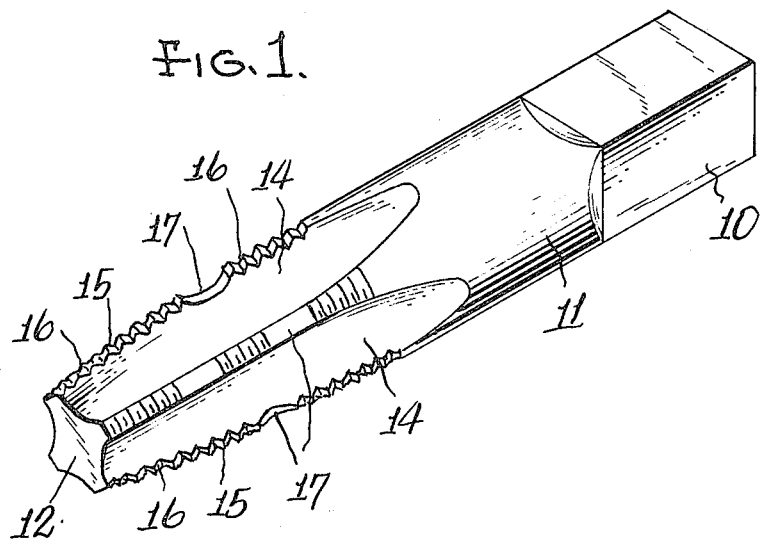
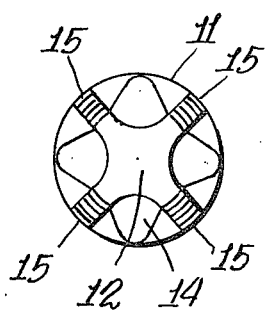
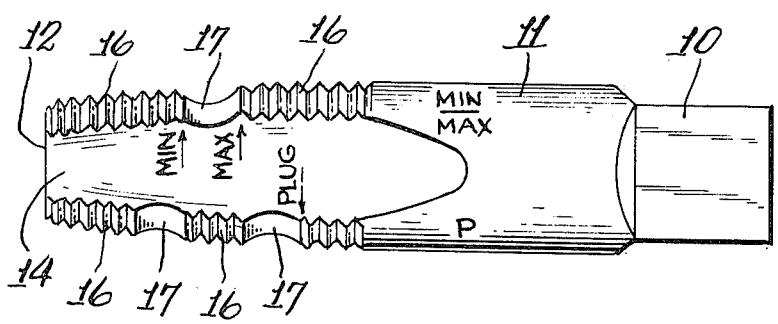
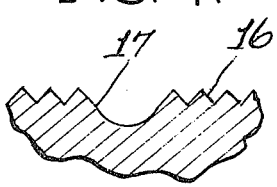
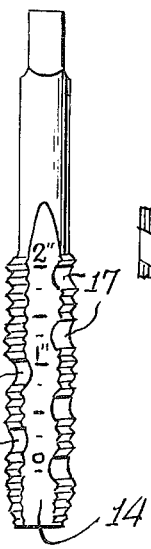
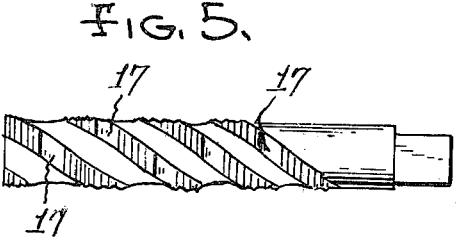

THREADING TAPS

BACKGROUND AND SUMMARY

Threading taps are well known in the prior art and comprise longitudinally extending flutes forming lands therebetween, the lands being provided with screw-cutting teeth. In use of such taps considerable care had to be exerted in the threading operation to avoid breaking the tap. It was customary to use cutting oil during the threading cutting operation and, even so, it was necessary to back off the tap one or more times to remove chips which otherwise might cause the tap to bind and break.

Attempts have been made in the prior art to overcome breaking of taps and these included the cutting of cross-grooves in the lands. However, these attempts were not considered practical since in some only a tooth was removed to form the groove or in others the groove did not extend deep enough and therefore did not provide adequate chip clearance. Still in others, the grooves were deep enough but were in radial alignment and therefore not only weakened the tap but caused stringing of the chips and consequent breakage of the tap.

In my improved tap, the cross-grooves in the lands are of a length equal to at least two teeth; have a depth greater than the root depth of the adjoining teeth; and are in staggered relation so that no transverse portion of the tap is material weakened. Also, because the cross-grooves are staggered, no stringing occurs since the chips are broken up between lands. In addition, I have positioned certain of the cross-grooves to define maximum and minimum limits for threading the tap to produce screw threads of a required number and depth in accordance with good machine shop practice.

DESCRIPTION OF THE DRAWING

In the drawing accompanying this specification and forming a part of this application, there is shown, for purpose of illustration an embodiment which my invention may assume, and in this drawing:

FIG. 1 is a perspective view illustrating a preferred embodiment of my improved tap, FIG. 2 is a side view of the tap, FIG. 3 is a view looking at the entering end of the tap, FIG. 4 is an enlarged fragmentary sectional view illustrating a cross-groove, FIG. 5 is a side view of a spiral tap, showing my invention applied thereto, and FIG. 6 is a side view of a straight tap, showing my invention applied thereto.

DESCRIPTION OF THE PREFERRED EMBODIMENT

The tap shown in FIGS. 1 through 4 incorporates certain features of prior art taps, such as the usual square head 10, and the bit portion 11 tapering to a smaller size at its entering end 12. The bit portion has the usual flutes 14 forming lands 15 therebetween, and each land is provided with screw-thread cutting teeth 16.

My invention may be utilized with taps having two or more flutes 14 and in the drawing four flutes are disclosed. Further, the flutes may be rectilinear, as seen in FIGS. 1 and 2, or spiral as seen in FIG. 5.

Cross-grooves 17 are formed on the lands 15 in any suitable manner, such as by a grinding operation. As seen in FIG. 4, each cross-groove is preferably arcuate in shape and of a length equal to at least two teeth. Also, the cross-groove has a depth greater than the root depth of the adjoining teeth. This provides adequate clearance for chips to pass to the longitudinal flutes 14 and prevents chips from jamming up in any one flute.

The improved tap may be used in normal manner but tapping operations will be materially accelerated because the tap may be fed faster and need not be backed out, at least not as frequently as before. Since the cross-grooves are in staggered relation, the teeth on a land will start the cutting of the thread and the consequent chip will be formed. However, before the formed chip reaches string proportions, it will be broken up by the cutting edge of the teeth on the staggered land, and therefore the chips remain small in size and are easily accommodated within the longitudinal flutes. Thus, faster tapping results, with the use of less cutting oil.

My invention also incorporates means to determine the maximum and minimum tapping depths of the tap. Heretofore, maximum and minimum gauges were used to determine whether or not the hole was tapped to a proper depth for a predetermined use. This required that the tap be withdrawn, the gauge inserted in the hole and and read, and the tap re-inserted and tapping operation continued if the proper depth of the threads had not been reached.

Tapped holes for pipe, grease fittings and external plugs required a certain predetermined thread depth, whereas tapped holes for a plug which is to be located below the plate surface required a greater thread depth.

My invention eliminates the need for maximum and minimum gauges by utilizing one or more cross-grooves to indicate thread depth. Thus, as seen in FIG. 2, the opposite ends of the top cross-groove 17 is utilized to indicate the maximum and minimum thread depth for pipes, grease fittings and the like. As shown, the end of the top groove (in FIG. 2) closer to the entering end 12 of the tap is utilized to indicate minimum threads, and this end may have an arrow, as shown, marked with a "min" designation, or such end may bear a predetermined color. The opposite end of the tap groove is utilized to indicate maximum thread and likewise may have an arrow or be colored. In order that the operator may quickly locate the maximum and minimum markings, the shank or bit portion may have "max" and min indications outside of the tap threads.

Again referring to FIG. 2, the inner-most end of the lower cross-groove may be utilized to indicate predetermined distance for internally located plugs, and indications as before noted, may be applied to the tap.

It is an important aspect of my invention that the cross-grooves are in staggered relation so as to produce their beneficial purposes without materially weakening the tap in a transverse direction. As best seen in FIG. 2, the upper land therein shown is formed with one cross-groove 17 whereas the lower land is formed with two cross-grooves 17 but it will be noticed that the cross-grooves are out of radial alignment so that the cross-section of the tap is not materially reduced. It will of course be appreciated that the number of cross-grooves may be varied, as long as they are disposed in staggered relation, and retain the size above mentioned.

FIG. 6 discloses a straight tap, having flutes 14 and staggered cross-grooves 17. One or more of the flutes may bear designations to indicate tapping depth. For example, the zero designation may indicate that part of the tap at the start of forming a complete thread, and the following designations may indicate in inches the depth of the formed thread. It will be appreciated that instead of numerical designations, the various depths may be indicated by letters, or by color. It will be noted that the depth designations adjoin succeeding cross-grooves.

I claim:

1. A threading tap capable of continuous forward threading movement without intermediate backing-off, said tap having a plurality of longitudinally extending flutes forming a plurality of longitudinally extending lands therebetween, each of said lands having similar full-shaped thread-cutting teeth formed thereon, and each land having at least one cross-groove formed therein of arcuate shape in a direction longitudinally of the land and of a length equal to at least two teeth and of a depth greater than the root depth of adjoining teeth to thereby establish communication between adjoining flutes, each cross-groove in each land being longitudinally off-set from each cross-grove in an adjoining land to provide for chip clearance and yet not materially weaken the structure of said tap.

2. The construction according to claim 1 wherein a said cross-groove is spaced a predetermined distance from the entering end of said tap to indicate the limit of tap threading for a selected use.

3. The construction according to claim 2 wherein said cross-groove is of a predetermined length with the longitudinally opposite ends thereof indicating minimum and maximum limits for said tap threading.

4. The construction according to claim 3 wherein the tap is provided with alphameric indicia at the minimum and maximum limits.

5. The construction according to claim 1 wherein said tap is a tapered tap with its effective diameter increasing throughout the active length thereof.

* * * * *